US010327584B2

(12) United States Patent
Shingler et al.

(10) Patent No.: US 10,327,584 B2
(45) Date of Patent: Jun. 25, 2019

(54) INDOOR/OUTDOOR COOKING SYSTEM

(71) Applicant: Evo, Inc., Beaverton, OR (US)

(72) Inventors: Robert A. Shingler, Beaverton, OR (US); Joseph R. Shaw, Beaverton, OR (US)

(73) Assignee: EVO, Inc., Beaverton, OR (US)

( * ) Notice: Subject to any disclaimer, the term of this patent is extended or adjusted under 35 U.S.C. 154(b) by 0 days.

(21) Appl. No.: 15/011,337

(22) Filed: Jan. 29, 2016

(65) Prior Publication Data
US 2017/0215636 A1 Aug. 3, 2017

(51) Int. Cl.
A47J 36/08 (2006.01)
A47J 36/26 (2006.01)
A47J 37/07 (2006.01)

(52) U.S. Cl.
CPC ............ *A47J 36/08* (2013.01); *A47J 36/26* (2013.01); *A47J 37/0786* (2013.01)

(58) Field of Classification Search
CPC ...... F24C 15/2035; F24C 15/10; F24C 15/20; F24C 15/108
USPC ......... 99/366, 446, 375, 379, 400, 410, 325, 99/338
See application file for complete search history.

(56) References Cited

U.S. PATENT DOCUMENTS

| 3,068,877 | A | | 12/1962 | Jacobs | |
|---|---|---|---|---|---|
| 4,066,425 | A | * | 1/1978 | Nett | B01D 46/0058 126/299 D |
| 4,155,348 | A | * | 5/1979 | Ahlrich | F24C 15/20 126/299 D |
| 4,325,294 | A | * | 4/1982 | Hammond | A47J 37/06 126/37 B |
| 4,418,615 | A | | 12/1983 | Higgins | |
| 4,517,886 | A | * | 5/1985 | Bales | F24C 15/14 126/41 R |
| 4,731,252 | A | * | 3/1988 | Duncan | A47J 37/0694 426/523 |
| 5,279,214 | A | * | 1/1994 | Lamendola | A47J 37/0704 126/25 A |
| 5,619,982 | A | * | 4/1997 | Kelly | F24C 15/2021 126/299 D |

(Continued)

FOREIGN PATENT DOCUMENTS

WO 2015164236 A2 10/2015

OTHER PUBLICATIONS

ISA Korean Intellectual Property Office, International Search Report and Written Opinion Issued in Application No. PCT/US2017/015677, dated May 8, 2017, WIPO, 14 pages.

*Primary Examiner* — Dana Ross
*Assistant Examiner* — Joe E Mills, Jr.
(74) *Attorney, Agent, or Firm* — Alleman Hall Creasman & Tuttle LLP

(57) ABSTRACT

Examples are disclosed herein that relate to a cooking system. One example provides a cooking system including a body supporting a cooking surface, a grease trap receptacle positioned within the body, the grease trap receptacle including an opening to an outside of the body, a grease drain located adjacent to the cooking surface, the grease drain opening into the grease trap receptacle such that the grease drain and the grease trap receptacle define a watertight passage for water to flow from the cooking surface to the opening, and a grease trap movably positioned within the opening of the grease trap receptacle.

14 Claims, 6 Drawing Sheets

(56) References Cited

U.S. PATENT DOCUMENTS

| | | | | |
|---|---|---|---|---|
| 5,713,265 A * | 2/1998 | Strader | | F24C 15/14 126/41 R |
| 5,758,568 A * | 6/1998 | Moravec | | A47J 37/0611 99/349 |
| 6,079,320 A * | 6/2000 | Taber | | A47J 37/0611 99/340 |
| 6,644,175 B2 * | 11/2003 | Stephen | | A47J 37/0786 126/41 R |
| 7,377,210 B1 * | 5/2008 | Franco | | A47J 37/1271 141/340 |
| 7,731,846 B1 * | 6/2010 | Jones | | B65F 1/06 210/248 |
| 2005/0166906 A1 * | 8/2005 | Lightbourne | | F24C 7/10 126/9 R |
| 2006/0191528 A1 * | 8/2006 | Spangrud | | A47J 37/0713 126/275 R |
| 2009/0008375 A1 * | 1/2009 | Segers | | A47L 15/4293 219/201 |
| 2009/0025705 A1 * | 1/2009 | Hatjopoulos | | F24C 15/12 126/214 D |
| 2010/0077930 A1 * | 4/2010 | Bentz | | A47J 37/0676 99/422 |
| 2010/0139642 A1 * | 6/2010 | Pliml | | A47J 37/0704 126/25 R |
| 2010/0300425 A1 * | 12/2010 | Rees, Jr. | | A47J 37/0786 126/25 R |
| 2012/0204855 A1 * | 8/2012 | Huber | | F24C 15/2035 126/299 R |
| 2013/0032041 A1 | 2/2013 | Kramer et al. | | |
| 2013/0192182 A1 * | 8/2013 | Bro mann | | F24C 15/2035 55/385.4 |
| 2014/0013964 A1 * | 1/2014 | Hill | | A47J 37/06 99/446 |
| 2014/0161952 A1 * | 6/2014 | Sykes | | A47J 37/0611 426/523 |
| 2015/0305558 A1 * | 10/2015 | Nelson | | A47J 37/0611 99/375 |
| 2015/0327723 A1 * | 11/2015 | Leighton | | A47J 37/0731 126/25 R |
| 2016/0174766 A1 * | 6/2016 | Schlosser | | A47J 37/0704 126/25 R |

* cited by examiner

US 10,327,584 B2

INDOOR/OUTDOOR COOKING SYSTEM

BACKGROUND

Outdoor cooking systems are commonly exposed to environmental conditions such as rain and moisture. In view of these conditions, outdoor cooking systems commonly use fuels such as charcoal, gas and liquid petroleum.

SUMMARY

Examples are disclosed herein that relate to a cooking system suitable for indoor and outdoor use. One example provides a cooking system including a body supporting a cooking surface, a grease trap receptacle positioned within the body, the grease trap receptacle including an opening to an outside of the body, a grease drain located adjacent to the cooking surface, the grease drain opening into the grease trap receptacle such that the grease drain and the grease trap receptacle define a watertight passage for water to flow from the cooking surface to the opening, and a grease trap movably positioned within the opening of the grease trap receptacle.

Another example provides a cooking system including a body supporting a cooking surface, the body including a top surface and an inset cooking surface positioned below the top surface, an exhaust inlet disposed adjacent to the cooking surface, the exhaust inlet being vertically spaced above the inset cooking surface, a fan disposed within the body, the fan being configured to pull air through the exhaust inlet, and a drain located adjacent to the cooking surface, the drain being lower than the exhaust inlet and defining a watertight passage for water to flow from the cooking surface to an opening in a side of the body.

Another example provides a cooking system including a body supporting a cooking surface, the body including a frame, and a plurality of walls supported by the frame, the plurality of walls including an inset wall panel positioned within an area defined by adjacent wall panels, the inset wall panel being movable with respect to the frame and secured in place with a securing device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

For outdoor cooking systems without overhead hoods and with electrical components, it is important to remove water from the cooking surface in a manner that protects internal electrical components of the cooking system from contact with water. Accordingly, examples are disclosed herein that relate to a system configured for indoor and outdoor use that includes electrical components and also various waterproof features that help to facilitate cooking and ensure safety. One disclosed example includes a body supporting a cooking surface, and a drain located adjacent to the cooking surface, and an exhaust inlet disposed adjacent to the cooking surface and vertically spaced above the cooking surface. The drain opens into a grease trap receptacle that defines a watertight passage that allows water to flow from the cooking surface to an opening to an outside of the body. In this manner, water may quickly clear the cooking surface without reaching internal electrical components of the cooking system through the exhaust inlet or other openings. Further, one or more wall panels the body may be inset relative to adjacent wall panels. The inset relation to adjacent wall panels may help to prevent water from entering the body between the wall panels. Examples of these and other features are described below.

Figure 1:
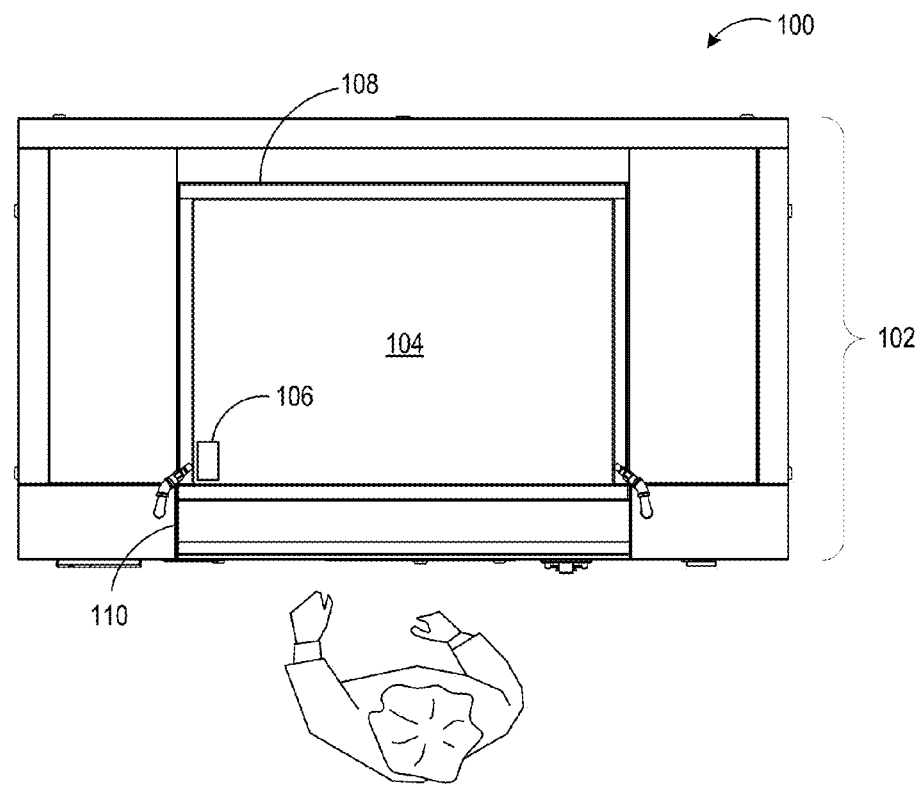
FIG. 1 shows a top view of an example indoor/outdoor cooking system.
Figure 2:
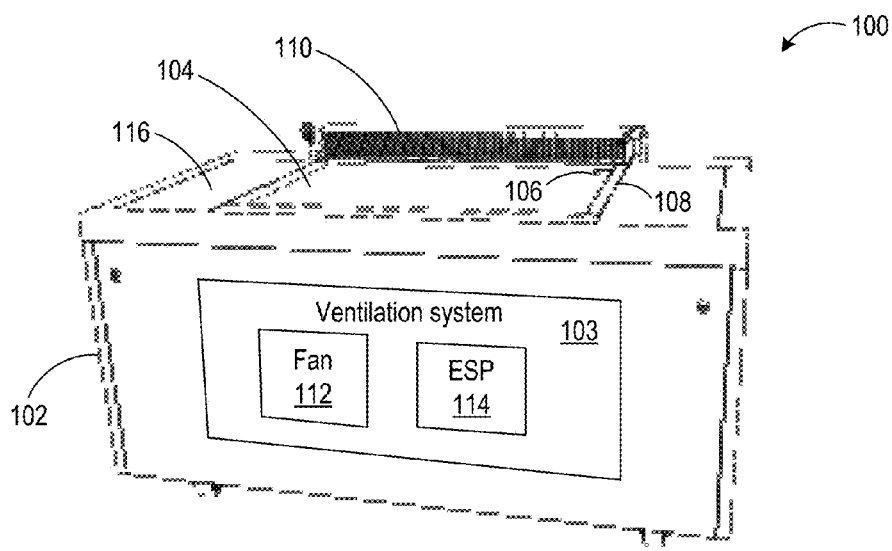
FIG. 2 shows a front view of the cooking system of FIG. 1.

FIG. 1 and FIG. 2 respectively show a top view and a front view of an example cooking system 100 suitable for both indoor and outdoor use. FIG. 2 further shows a partial block diagram of interior electrical components within the cooking system 100. The cooking system 100 includes a body 102 supporting a cooking surface 104, and an internal electrical ventilation system 103 within the body 102. As mentioned above, in an outdoor setting, water from sources such as rain may pose a safety risk if the water can reach the interior of the cooking system. If the water is able to pool on the cooking surface, risks of the water reaching the interior of the cooking system, e.g. via an exhaust inlet, may arise. As such, the cooking system 100 has various features to help mitigate such a risk. For example, the cooking system 100 includes a grease drain 106 located adjacent the cooking surface 104 and at or below a level of the cooking surface. The depicted grease drain 106 allows fluids to flow away from the cooking surface 104 without pooling on the cooking surface 104. Further, as mentioned above and described in more detail below, the grease drain 106 defines a watertight passage from the cooking surface 104, through the body 102, and to an outlet in the side of the body through which water may flow.

Other features also may help direct water through the grease drain 106 and away from other openings into the body. For example, the depicted cooking surface 104 is vertically inset below a surrounding rim 108. The rim 108 may be used as a location at which ingredients, utensils, etc. may be placed during cooking. The rim 108 also helps to prevent water that falls on the cooking system 100 from spilling over an edge of the cooking system 100, and thus helps to direct water into the grease drain 106.

As the cooking system 100 is configured for indoor and outdoor use, the cooking system 100 includes an exhaust inlet 110 disposed adjacent to the cooking surface 104, and a fan 112 disposed within the body 102 which is configured to pull cooking exhaust away from the cooking surface 104 through the exhaust inlet 110 for filtering via a filtering system, shown as an electrostatic precipitator (ESP) 114 located within the body 102.

In view of these internal components, the exhaust inlet 110 may be vertically spaced above the cooking surface 104 to avoid water that accumulates on the cooking surface 104 from being pulled into the exhaust inlet 110, where the water could reach these electrical components. FIG. 2 shows a front view of the cooking system 100, depicting an example of a vertical spacing of the exhaust inlet 110 above the cooking surface 104. This vertical spacing may help to prevent water from entering the exhaust inlet 110 and thus to direct water toward the grease drain 106, thereby helping to avoid water from entering the exhaust inlet 110. The exhaust inlet 110 may have any suitable vertical spacing above the cooking surface 104. As a non-limiting example, a bottom of the exhaust inlet 110 may be spaced at least 3 inches above the cooking surface 104. Further, as mentioned above, the cooking surface 104 may be inset below a top surface 116 of the body 102 to further distance the cooking surface 104 from the exhaust inlet 110. As a non-limiting example, the cooking surface 104 may be inset at least 0.5 inches below the top surface 116. Such an inset configuration may further help to prevent water from spilling over the sides of the cooking system 100. In other examples, the rim 108 may be at a same height of the top surface 116, or may be omitted.

Other components of the cooking surface 104 likewise may be configured to prevent water from entering an interior of the body 102. For example, the cooking surface 104 may be made from metal (e.g. mild steel) treated in a manner that helps to avoid warping or sag over time. Such warping or sag of the cooking surface may lead to fluids pooling on the cooking surface 104, and also may additionally create a gap between the cooking surface and the surrounding table top, potentially allowing food and fluids to enter the interior of the cooking system 100. Thus, forming the cooking surface 104 via a surface treatment process configured to help resist such warping or sag may further prevent water damage to an interior of the outdoor cooking system 100. As one non-limiting example, the cooking surface 104 may be formed from a laser-cut hot-rolled steel plate. Prior to incorporation into the cooking system 100, the steel plate may be annealed, and then ground on both the top and bottom sides to form the cooking surface 104. In some examples, approximately 0.005 inches of material may be removed from each side of the steel plate by grinding. Such a treatment may help to reduce stress and/or strain in the cooking surface, and thus may help to avoid warping of the cooking surface over time. In other examples, any other suitable grinding process may be used.

The vertically spaced exhaust inlet 110, the inset cooking surface 104, and the optionally raised rim 108, may together help to ensure that fluids collected on the cooking surface 104 flow down the grease drain 106. Further, the cooking surface treatment process may help to ensure that the cooking surface maintains this functionality over time.

Figure 3:
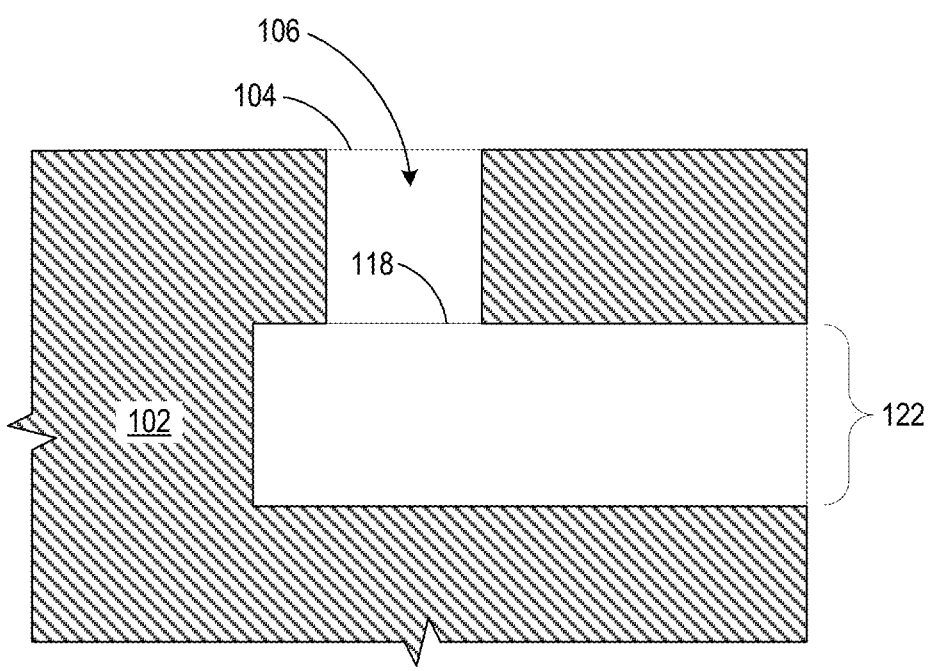
FIG. 3 shows a partial interior schematic view of the body of the cooking system of FIG. 1.

As mentioned above, the grease drain 106 leads to a watertight passage through the body 102 and to an outside of the cooking system 100. FIG. 3 shows a partial interior schematic sectional view of the body 102 as seen from a side perspective, illustrating an example configuration of the grease drain 106, which leads to an opening of a grease trap receptacle 118 in the body 102. The grease drain 106 may take the form of a seamless chute which may be welded to the cooking surface and the grease trap receptacle 118, in some examples. In this figure, various other structures, such as the exhaust inlet 110, are omitted for clarity. In some examples, the grease trap receptacle 118 may take the form of a welded metal container configured to accommodate a drawer-like removable grease trap, described below. The grease trap receptacle 118 may be attached to an inner surface of the body 102 in any suitable watertight manner. As one non-limiting example, the grease trap receptacle 118 is attached to an inner wall surface of the body 102 via one or more studs (not shown) that are welded to the wall surface, and then sealed with a waterproof interface material, such as a silicone material. The one or more welded studs in the wall surface may be threaded studs securable with threaded nuts, for example, or any other suitable type of stud that helps to avoid the creation of gaps between the stud and the wall surface when welded, thus preventing the passage of fluids. Correspondingly, the grease trap receptacle may have one or more complementary openings to accommodate the welded studs. In other examples, the grease trap receptacle 118 may be welded to another suitable interior portion of the body, or may be attached in another suitable manner. As the grease drain 106 and the grease trap receptacle 118 define a watertight passage for fluids to flow through the grease drain 106 and through an opening 122 to the outside of the body 102, such fluids are prevented from reaching internal electrical components.

Figure 4A:
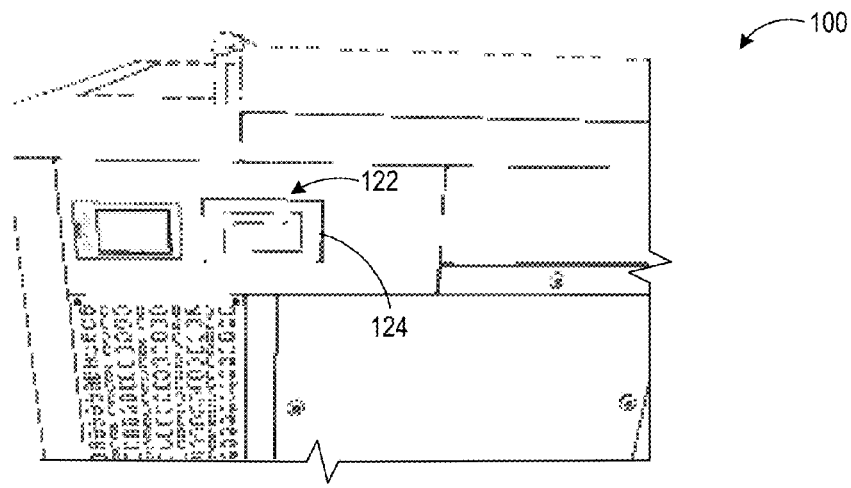
FIGS. 4A-C show various views of an example grease trap receptacle of the cooking system of FIG. 1.
Figure 4B:
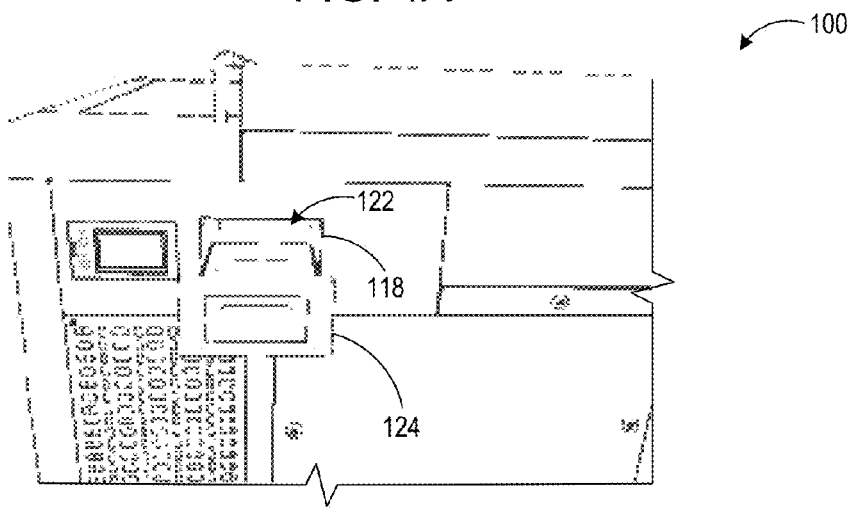
Figure 4C:
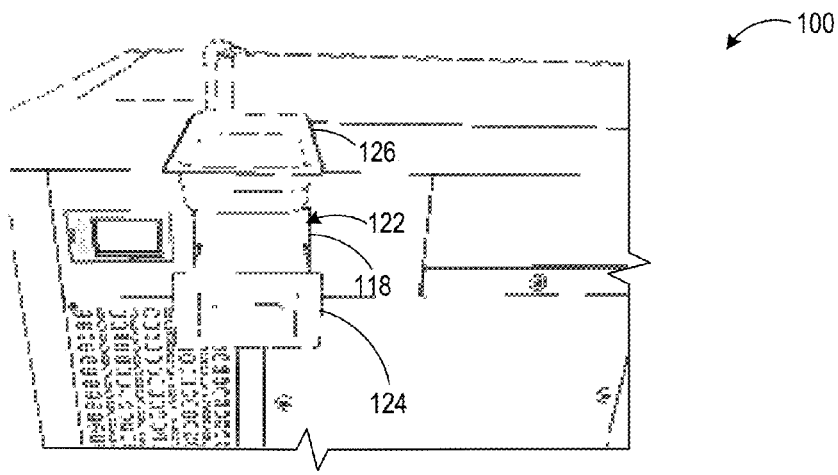

The grease trap 124 is movably positioned within the opening 122 of the grease trap receptacle 118. FIGS. 4A-C show additional views of the grease trap 124, and illustrate a handle that allows the grease trap 124 to be pulled out of grease trap receptacle 118. The grease trap 124 may further include a removable tray 126, which may capture cooking byproducts that fall through the grease drain 106 and into the grease trap 124. The removable tray 126 may be periodically removed from the grease trap 124 and emptied or discarded/replaced.

Figure 5:
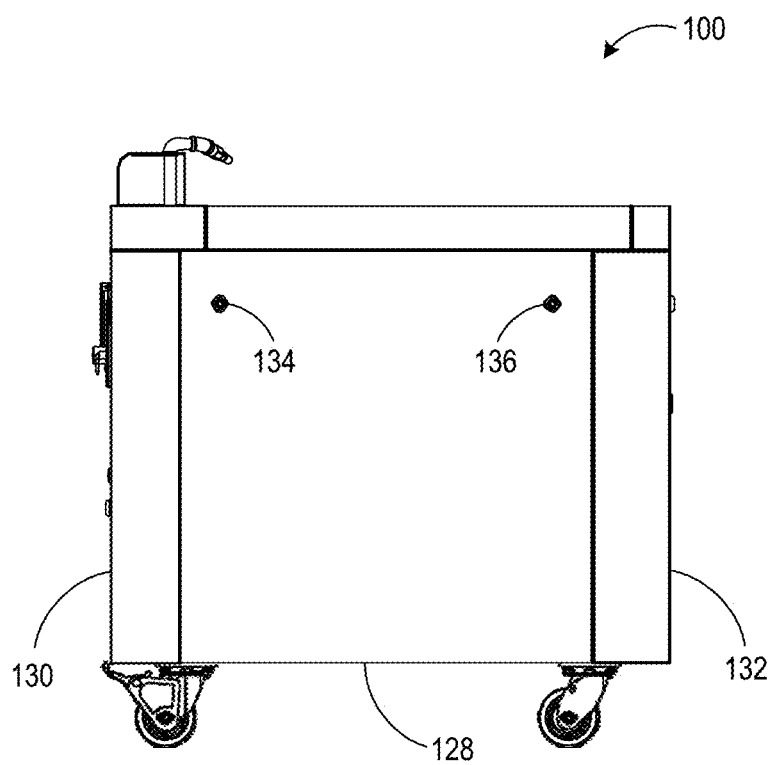
FIG. 5 shows an example inset wall panel from a side view of the cooking system of FIG. 1.

The cooking system 100 may include additional waterproof features to help to prevent water from entering the interior of the body 102. For example, as mentioned above, the cooking system 100 may include wall panels having an inset configuration relative to adjacent panels. FIG. 5 shows a side view of the cooking system 100 having an inset wall panel 128. The wall panel 128 is positioned between adjacent wall panels 130 and 132, and is secured in place with one or more securing devices 134 and 136. Securing devices 134 and 136 may each comprise a cam lock or other suitable fastener or device that removably secures the wall panel 128 to a frame of the cooking system 100.

Figure 6:
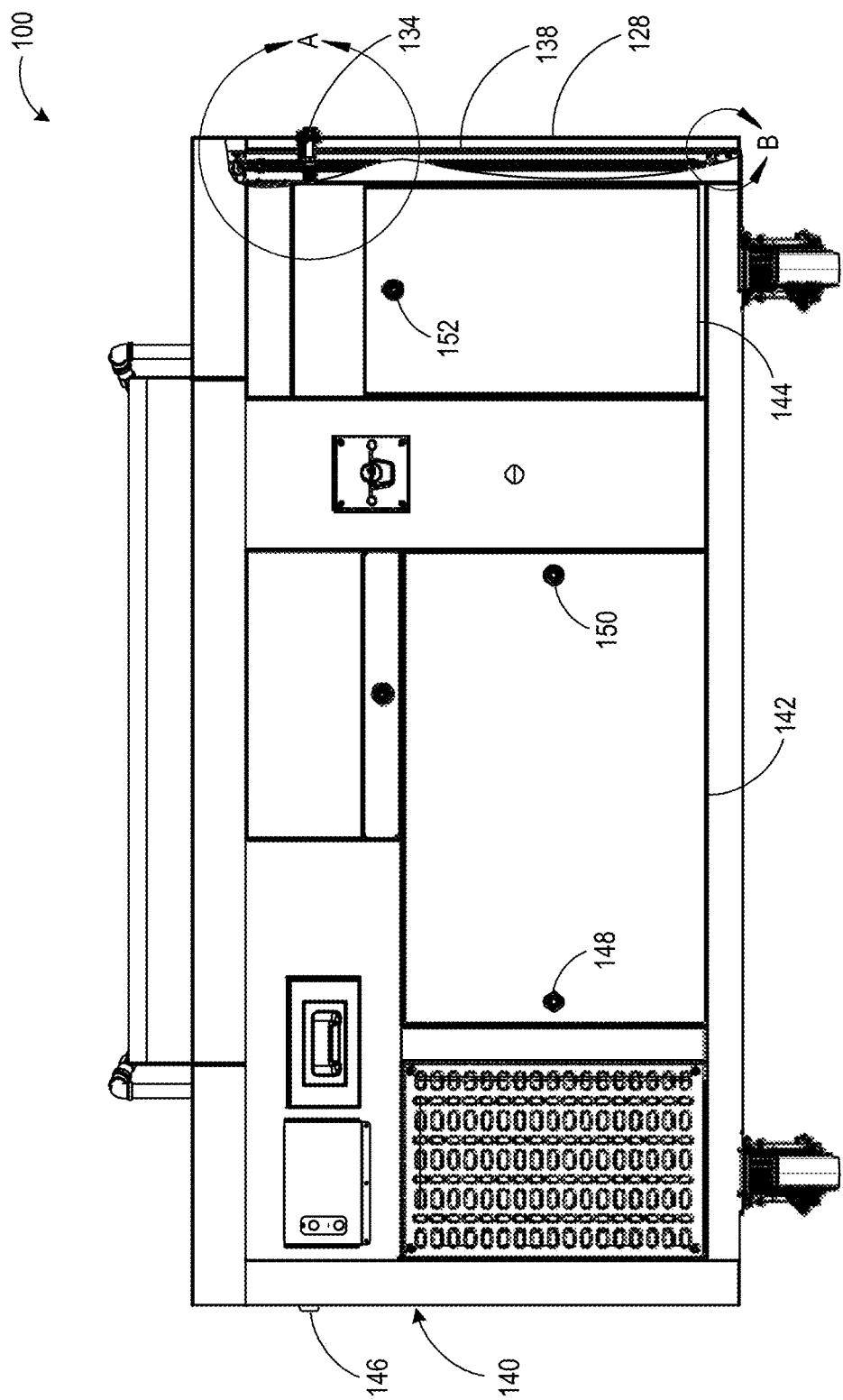
FIG. 6 shows a partial sectional view of the inset wall panel of FIG. 6.
Figure 7:
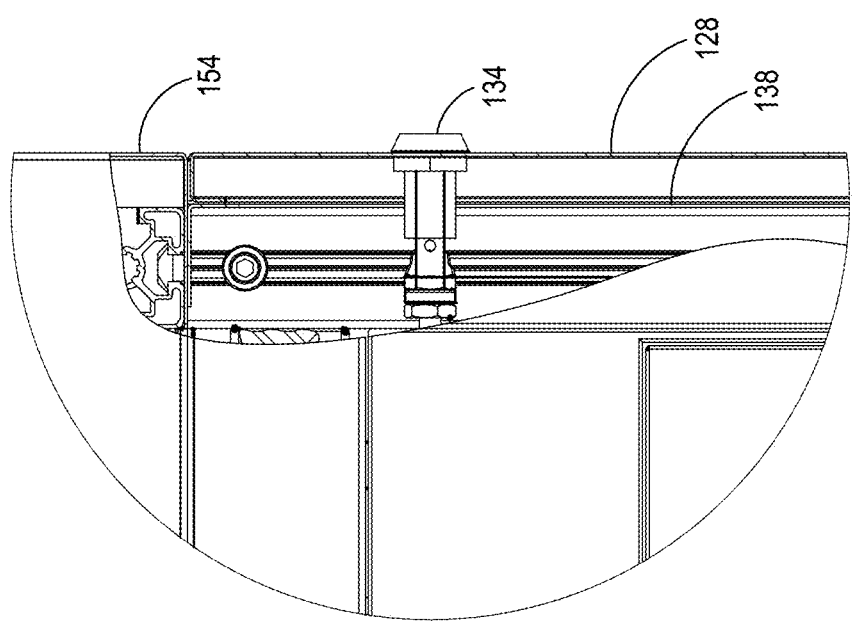
FIG. 7 shows a detailed view of the inset A of FIG. 6.

FIG. 6 shows a rear view of the cooking system 100 and depicts a partial sectional view of the wall panel 128 attached to a frame 138. FIG. 6 also shows other wall panels having inset configurations, for example at 140, 142, and 144. Each of the depicted wall panels is configured to be removable, and is attached to the frame 138 of the cooking system 100 respectively via securing devices 146, 148 and 150, and 152. FIG. 7 shows detail A of FIG. 6, illustrating a close-up sectional view of the wall panel 128 and securing device 134, shown here as a cam lock. The securing device 134 secures the wall panel 128 to the frame 138 by the rotation of a cam, e.g. a part that acts as a latch or arm, into an extruded channel within the frame 138. As long as the cam of the securing device 134 is locked in such a position within the extruded channel, the wall panel 128 remains fastened to the frame 138. The cam of the securing device 134 may be rotated out of the locked position, e.g. via the insertion and turning of a key, thereby releasing the cam from the extruded channel rotating and allowing the wall panel 128 to be unfastened and removed. The inset configuration of wall panel 128 is illustrated by its relation with an adjacent panel 154 positioned above wall panel 128. The exterior surfaces of the wall panel 128 and the adjacent wall panel 154 are approximately flush when the wall panel 128 is secured to the frame 138, as the portion of the frame 138 to which the wall panel 128 attaches is inset from the exterior surface of wall panel 154. The inset configuration of the wall panel 128 may help to prevent water from seeping into the interior of the body 102 from between the wall panels, due to the depth of the inset.

Figure 8:
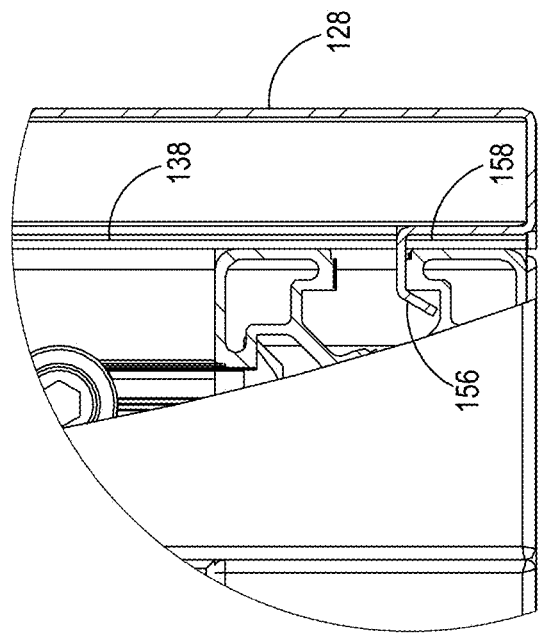
FIG. 8 shows a detailed view of the inset B of FIG. 6.

FIG. 8 shows detail B of FIG. 6, illustrating a sectional view of a lower portion of the wall panel 128. The depicted wall panel 128 includes an example of an internally-extending lip 156 configured to engage a complementary connector 158 of the frame 138. The connector 158 may be formed, for example, via extrusion of a channel along the bottom of the frame 138, or in any other suitable manner. As the depicted connector and lip are located above a bottom edge of the wall panel 128, they help to prevent water from entering the body at the lower joint between the wall and the frame.

In the depicted configuration, the wall panel 128 may be movable or removable with respect to the frame 138. For example, an upper portion of the wall panel 128 may be detached from the frame 138 by unlocking the securing devices 134 and 136, while the lower portion of the wall panel 128 remains supported by the connection between the lip 156 and the connector 158. This configuration permits access to the interior of the cooking system 100 when needed. Further, the wall panel 128 may be fully removed by lifting the lip 156 out of engagement with the connector 158. It will be understood that although one wall panel is discussed with regard to FIGS. 5-8, the cooking system 100 may include any suitable number of additional inset wall panels that are movably attached to the body 102. Further, each inset wall panel may be sealed with a waterproof material, such as a silicone material.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A cooking system, comprising:
a body supporting a cooking surface, the body comprising a rim and the cooking surface being vertically inset below the rim of the body;
a grease drain comprising a chute connected to an underside of the cooking surface via a first weld;
a grease trap receptacle positioned within the body, the grease trap receptacle being connected to the grease drain via a second weld and also being connected to an opening to an outside of the body via a watertight seal such that the grease drain, the grease trap receptacle and the first and second welds define a sealed, watertight passage for water to flow from the cooking surface to the opening to the outside of the body;
a grease trap movably positioned within the opening of the grease trap receptacle, such that when the grease trap is removed, the watertight passage remains watertight from the cooking surface to the opening to the outside of the body;
an exhaust inlet vertically spaced above the cooking surface; and
an electrical ventilation fan disposed within the body to pull exhaust through the exhaust inlet.

2. The cooking system of claim 1, wherein the grease trap receptacle comprises a welded metal container attached to an inner surface of a portion of the body.

3. The cooking system of claim 1, wherein the grease trap receptacle is attached to an interior of the body via one or more studs.

4. The cooking system of claim 3, further comprising a waterproof interface material disposed between the grease trap receptacle and the interior of the body.

5. The cooking system of claim 1, wherein the exhaust inlet is disposed at least 3.5 inches above the cooking surface.

6. The cooking system of claim 1, wherein a distance between the cooking surface and the top surface is at least 0.5 inches.

7. A cooking system, comprising:
a body supporting a cooking surface, the body comprising a rim, wherein the cooking surface is vertically inset below the rim;
an exhaust inlet disposed adjacent to the cooking surface, the exhaust inlet being vertically spaced above the inset cooking surface;
an electric ventilation fan disposed within the body, the fan being configured to pull air through the exhaust inlet;
a drain comprising a chute connected to an underside of the cooking surface via a first weld, the drain being lower than the exhaust inlet;
a grease trap receptacle positioned within the body, the grease trap receptacle comprising a welded metal container being connected to the drain via a second weld and also being connected to an opening to an outside of the body via a watertight seal such that the drain, the grease trap receptacle, and the first and second welds define a sealed, watertight passage for water to flow from the cooking surface to the opening to the outside of the body; and
a grease trap movably positioned within the opening of the grease trap receptacle, such that when the grease trap is removed, the watertight passage remains watertight from the cooking surface to the opening to the outside of the body.

8. The cooking system of claim 7, wherein a distance between the inset cooking surface and the top surface is at least 0.5 inches.

9. The cooking system of claim 7, wherein the inset cooking surface comprises an annealed sheet of mild steel having a pre-ground top surface and a pre-ground bottom surface.

10. The cooking system of claim 7, wherein the exhaust inlet is disposed at least 3.5 inches above the inset cooking surface.

11. The cooking system of claim 7, further comprising an inset wall panel positioned within the body and defined by adjacent wall panels, the inset wall panel being movable with respect to the body and secured in place with a securing device.

12. A cooking system, comprising:
a body supporting a cooking surface, the body comprising a frame, and a plurality of walls supported by the frame, the plurality of walls including an inset wall panel positioned within an area defined by adjacent wall panels, the inset wall panel comprising an internally-extending lip configured to engage a connector of the frame to secure the inset wall panel to the frame such that the lip and connector are located above a bottom edge of the wall panel to prevent water from entering the body from outside between the inset wall and the frame;

a grease drain comprising a chute connected to an underside of the cooking surface via a first weld;

a grease trap receptacle positioned within the body, the grease trap receptacle being connected to the grease drain via a second weld and also being connected to an opening to an outside of the body via a watertight seal such that the grease drain, the grease trap receptacle and the first and second welds define a sealed, watertight passage for water to flow from the cooking surface to the opening to the outside of the body; and a grease trap movably positioned within the opening of the grease trap receptacle, such that when the grease trap is removed, the watertight passage remains watertight from the cooking surface to the opening to the outside of the body.

13. The cooking system of claim 12, wherein the inset wall panel is sealed with a waterproof interface material.

14. The cooking system of claim 12, further comprising an electrical ventilation fan located within the body.

* * * * *